United States Patent
Yim et al.

(10) Patent No.: US 8,443,144 B2
(45) Date of Patent: May 14, 2013

(54) STORAGE DEVICE REDUCING A MEMORY MANAGEMENT LOAD AND COMPUTING SYSTEM USING THE STORAGE DEVICE

(75) Inventors: Keun Soo Yim, Yongin-si (KR); Jae Cheol Son, Seoul (KR); Bong Young Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 12/176,491

(22) Filed: Jul. 21, 2008

(65) Prior Publication Data

US 2009/0235014 A1    Sep. 17, 2009

(30) Foreign Application Priority Data

Mar. 12, 2008  (KR) .................. 10-2008-0022961

(51) Int. Cl.
*G06F 13/00*     (2006.01)
(52) U.S. Cl.
USPC .......................................... 711/118; 711/170
(58) Field of Classification Search .................. 711/118, 711/170
See application file for complete search history.

(56) References Cited

U.S. PATENT DOCUMENTS

| | | | | |
|---|---|---|---|---|
| 5,912,906 A * | 6/1999 | Wu et al. | ........................ | 714/763 |
| 6,052,789 A * | 4/2000 | Lin | ................................ | 713/300 |
| 6,405,332 B1 * | 6/2002 | Bando et al. | ................... | 714/723 |
| 6,557,077 B1 * | 4/2003 | Ghosh et al. | ................... | 711/118 |
| 6,567,899 B2 * | 5/2003 | Ghosh et al. | ................... | 711/156 |
| 6,972,977 B1 * | 12/2005 | Urabe | ......................... | 365/49.11 |
| 7,181,578 B1 * | 2/2007 | Guha et al. | ..................... | 711/154 |
| 7,275,135 B2 * | 9/2007 | Coulson | ......................... | 711/143 |
| 2002/0194440 A1 * | 12/2002 | Ghosh et al. | ................... | 711/156 |
| 2003/0046493 A1 * | 3/2003 | Coulson | ......................... | 711/118 |
| 2003/0221069 A1 * | 11/2003 | Azevedo et al. | ............... | 711/136 |
| 2007/0150653 A1 * | 6/2007 | Cooray et al. | ................. | 711/118 |
| 2007/0211529 A1 * | 9/2007 | Santis et al. | ............. | 365/185.08 |
| 2009/0024752 A1 * | 1/2009 | Shitomi | ......................... | 709/230 |
| 2009/0106498 A1 * | 4/2009 | Lepak et al. | ................... | 711/137 |

FOREIGN PATENT DOCUMENTS

| | | |
|---|---|---|
| JP | 11-110283 | 4/1999 |
| JP | 2001-350665 | 12/2001 |
| KR | 10-2006-0117899 | 11/2006 |
| KR | 10-2006-0123573 | 12/2006 |
| KR | 10-2007-0047329 | 5/2007 |

* cited by examiner

*Primary Examiner* — Reba I Elmore
(74) *Attorney, Agent, or Firm* — NSIP Law

(57) ABSTRACT

A computing system and a memory device are provided. The memory device includes a first memory having a first storage capacity. A second memory is also provided having a second storage capacity greater than the first storage capacity. The memory device also includes a controller to provide an external host with an address space corresponding to a third storage capacity, the third storage capacity being less than a sum of the first storage capacity and second storage capacity. The controller transmits the requested data to the external host from the first memory where data requested from the external host is stored in the first memory, and where the requested data is not stored in the first memory, transmits the requested data to the external host from the second memory.

20 Claims, 7 Drawing Sheets

STORAGE DEVICE REDUCING A MEMORY MANAGEMENT LOAD AND COMPUTING SYSTEM USING THE STORAGE DEVICE

CROSS-REFERENCE TO RELATED APPLICATION

This application claims the benefit under 35 U.S.C. §119(a) of a Korean Patent Application No. 10-2008-0022961, filed on Mar. 12, 2008, in the Korean Intellectual Property Office, the entire disclosure of which is incorporated herein by reference.

TECHNICAL FIELD

The following description relates to a storage device and computing system, and more particularly, to a storage device based on a non-volatile memory and computing system using the storage device.

BACKGROUND

Types of data storage include a magnetic disk, a semiconductor memory, and the like. Since each type of data storage has different physical characteristics, a management system corresponding to the different physical characteristics may be needed.

A magnetic disk is widely used as a storage device. Generally, the magnetic disk has an average read/write time in milliseconds per kilobyte. Since times vary for an arm to reach a different physical location where data is stored, the magnetic disk has a characteristic in that the read/write time varies depending on the location where the data is stored.

A host or processor may access a storage device to store data in the storage device or read data stored in the storage device. Since time for a host or processor to read data from a storage device may be relatively long, the host or processor may use a memory storing a portion of the data stored in the storage device. In this case, data input/output time of a memory may be shorter than that of a magnetic disk.

A host or processor may have a tendency to read data once again, which was read in the near past. The tendency is referred to as the temporal locality. A conventional storage device and management system may use a buffer memory that temporarily stores data read by a host or processor from the storage device to utilize the temporal locality.

With increasing operation speed of a host or processor, a high-speed buffer memory has been used. For example, a cache memory and main memory have been used. A cache memory may be closest to a host or processor and may be operated most quickly. A main memory may be located between the cache memory and a storage device, and may be operated more slowly than the cache memory while more quickly than the storage device.

The processor, cache memory, main memory, and storage device structure may be referred to as a memory hierarchy. Depending on applications, a cache memory may include a hierarchy including a level 1 (L1) cache memory and a level 2 (L2) cache memory.

SUMMARY

In one general aspect, there is provided a memory device and a computing system using the same, which reduces a memory management load of a host or processor.

In another general aspect, there is provided a memory device and a computing system using the same, which simplifies an address translation process between a host or processor and a memory so as to extend a data bandwidth between the host and the memory.

In still another general aspect, there is provided a memory device and a computing system using the same, which simplifies a booting process so as to reduce a booting time.

In still another general aspect, there is provided a memory device and a computing system using the same, which optimizes a use of different types of memories so as to reduce power consumption.

In still another general aspect, there is provided a memory device and a computing system using the same, which provides an interface suitable for a standard configuration-based memory device.

In still another general aspect, a memory device includes a first memory having a first storage capacity, a second memory having a second storage capacity greater than the first storage capacity, and a controller to provide an external host with an address space corresponding to a third storage capacity, the third storage capacity being less than a sum of the first storage capacity and second storage capacity, wherein the controller, where data requested from the external host is stored in the first memory, transmits the requested data to the external host from the first memory, and where the requested data is not stored in the first memory, transmits the requested data to the external host from the second memory.

An address indicating the address space provided to the external host may be divided into a plurality of address fields, and the controller may access the first memory by referring to a first address and second address of the divided address fields, and determine whether the requested data is stored in the first memory using the first address.

The controller, where the requested data is not stored in the first memory, may read the requested data from the second memory while receiving the second address from the external host.

The controller, where the requested data is not stored in the first memory, may read a data block corresponding to a second address of the requested data from the second memory, and store the data block in the first memory.

The first address may be a row address and second address may be a column address.

The third storage capacity may be greater than the first storage capacity. The second memory may be a non-volatile memory which retains stored data when not powered and is randomly accessible to the external host by a word.

In still another general aspect, a computing system includes a non-volatile memory, a host to convert a virtual address into a physical address of the non-volatile memory based on state information of blocks of the non-volatile memory, and an interface to transmit the physical address of the non-volatile memory from the host to the non-volatile memory, and transmit data between the host and the non-volatile memory.

The state information may comprise a number of times that each of the blocks is erased.

The host may convert the virtual address into any one of a physical address of a virtual memory and the physical address of the non-volatile memory, store a correspondence between the virtual address and the physical address of the virtual memory or a correspondence between the virtual address and the physical address of the non-volatile memory, and store a flag indicating a characteristic of the stored physical address.

The host may control a garbage collection operation with respect to each of the blocks of the non-volatile memory using the physical address of the non-volatile memory.

The host may acquire the state information of the non-volatile memory using a driver, and control an erase operation of a block corresponding to the physical address of the non-volatile memory based on the state information of the block corresponding to the physical address of the non-volatile memory from among blocks of the non-volatile memory, the driver corresponding to the non-volatile memory and being provided by an operating system.

The non-volatile memory may include a standard configuration prescribed based on a standard, and the host may acquire the state information based on the standard configuration of the non-volatile memory, the standard configuration prescribing at least one of a number of channels of the non-volatile memory, a number of banks for each channel of the non-volatile memory, and a unit of an erase operation of the non-volatile memory.

In still another general aspect, a memory device includes a volatile memory, a non-volatile memory, and a controller to receive a virtual address from an external input, and convert the virtual address into any one of a physical address of the volatile memory and a physical address of the non-volatile memory based on temporal locality of the virtual address.

The controller may store a correspondence between the virtual address and the converted physical address of any one of the volatile memory and non-volatile memory.

The external input may be any one of an external host, an external cache controller, a memory controller, and a system chipset.

In still another general aspect, a memory device includes a volatile memory, a non-volatile memory, and a controller to receive a virtual address from any one of an external host, an external cache controller, a memory controller, and a system chipset, and determine whether the virtual address corresponds to a first area or a second area, wherein the controller, where the virtual address corresponds to the first area, converts the virtual address into a physical address of the volatile memory, and where the virtual address corresponds to the second area, converts the virtual address into a physical address of the non-volatile memory.

The controller may determine whether the virtual address corresponds to the first area or the second area based on allocation information determined by any one of the external host, external cache controller, memory controller, and system chipset according to a data characteristic corresponding to the virtual address.

The virtual address may correspond to the first area or the second area may be determined by the external host or the external cache controller based on temporal locality of data corresponding to the virtual address.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

Figure 1:
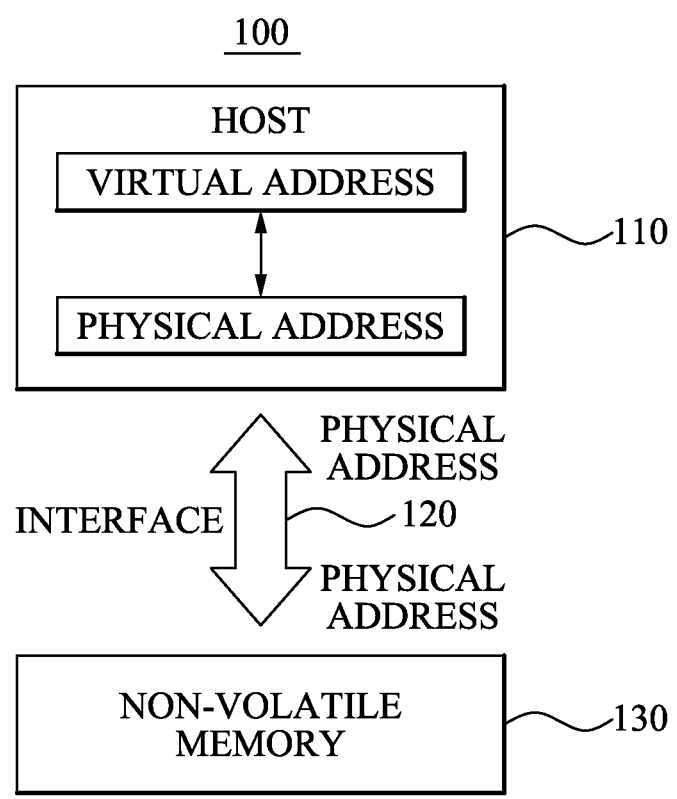
FIG. 1 is a diagram illustrating a computing system according to an exemplary embodiment.

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

A magnetic disk is widely used as a storage device. Types of magnetic disk storage device include, for example, a floppy disk drive, a hard disk drive (HDD), and the like. In particular, the HDD is widely used because it provides large capacity. An arm of the HDD accesses a rotating magnetic disk in the HDD, and the HDD reads data from a track of the magnetic disk or stores data in the track.

In an initial booting process of a computing system having the storage device, a booting time of the computing system using the HDD may be long due to a time that the magnetic disk rotates and data read time. Therefore, the initial booting time of computing system using the HDD may be relatively long in comparison to that of a semiconductor memory.

In the HDD, where a rotation speed of the magnetic disk reaches a predetermined level, for example, 6000 rpm (revolutions per minute), an input/output of data may be stable. Accordingly, a time for accelerating the rotation of the magnetic disk may be required until the rotation speed of the magnetic disk reaches the predetermined level when booting.

Also, when booting, a time for loading data stored in the HDD to a main memory of the HDD may be required. Since the data read time in the HDD is relatively long in comparison to that of a semiconductor memory, time for loading the data stored in the HDD may be long when booting.

When the main memory is a volatile memory, data may be required to be frequently stored in the HDD to maintain data consistency. Since the HDD uses the rotation of the magnetic disk, a relatively long time for inputting and/or outputting of data may be required. The HDD may access the data through an operation where a head, located at an end of an arm of the HDD, moves to a location of a desired track or sector. Accordingly, where inputting and/or outputting random data, referred to as random I/O, performance may be degraded.

Since the amount of the main memory is typically smaller than that of the storage device, a memory required by an application may be larger than the amount of the main memory. A page swapping refers to an operation of fetching data required by the main memory and storage device, and evicting data to swap with a location of the fetched data. A speed of the page swapping may be determined by an operation speed of a device that has a slower operation speed from among the main memory and storage device. Accordingly, the slower speed of the storage device may determine the speed of the page swapping.

Where data, stored in the main memory, which is a volatile memory, is updated, the data stored in the storage device may be required to be updated. This is referred to as a write-through scheme. In this case, the data stored in the storage device corresponds to the data stored in the main memory. That is, every time the data stored in the main memory is updated, the data stored in the storage device may be updated in the write-through scheme. In a write-back scheme, data is marked where data stored in the main memory is updated. Here, the data stored in the storage device is updated at regular intervals or where a number of update marks is greater than a predetermined number in the write-back scheme. The write-back scheme may be referred to as a write-behind scheme. Where the data stored in the main memory is updated, the data stored in the main memory may be referred to as being dirty.

Since data to be updated from among data stored in a memory, generally has high temporal locality, the data may be updated frequently in the near future. In this case, data stored in a same location may be repeatedly stored in the storage device, and thus a slow operation speed of the HDD storage device may decrease an operation speed of a computing system.

The HDD may consume relatively a large amount of power while being mechanically operated, for example, for disk rotation or arm movement. Although an operation of the HDD may be a portion of an entire application, due to the large power consumption, a method of cutting power supply may be provided when the HDD is not used. Since large amount of power is consumed when operated again after the power off, a dynamic power management scheme which controls a rotation speed of the HDD disk may be used.

A Dynamic Random Access Memory (DRAM) is widely used for a main memory. In DRAM, a large amount of power may be consumed due to an operation of refreshing data stored in a memory cell at regular intervals. According to an exemplary embodiment, power consumption of the computing system may be reduced by using a non-volatile memory consuming less power than that of a volatile memory.

FIG. 1 illustrates an exemplary computing system 100.

As illustrated in FIG. 1, the computing system 100 includes a host 110, and an interface 120 for interfacing with a non-volatile memory 130.

The non-volatile memory 130 may include a plurality of physical blocks. The plurality of physical blocks includes a plurality of memory cells, and the plurality of memory cells is identified by a physical address.

The host 110 may store data using a virtual address used in an operating system (OS), and read the data. The host 110 may have state information of the plurality of physical blocks and a configuration of the plurality of physical blocks. The host 110 may convert the virtual address into a physical address based on the state information and the configuration of the plurality of physical blocks of the non-volatile memory 130.

The host 110 may convert the virtual address into a physical address of a virtual memory or a physical address of the non-volatile memory 130. The virtual memory is a memory system enabling the OS to recognize a physically fragmented memory as a memory having a contiguous address space.

The host 110 may include a page table or an address translation table. The page table or address translation table may store the physical address of the non-volatile memory 130 or physical address of the virtual memory in order. An entry stored in the page table or address translation table may be the physical address of the non-volatile memory 130 or physical address of the virtual memory. Also, an address of the entry in the page table and address translation table may function as a virtual address.

Where the computing system 100 further includes a volatile memory (not shown), such as a DRAM, the host 110 may map the virtual address to any one of the DRAM or non-volatile memory 130. Where the virtual address is mapped to the DRAM, the host 110 may convert the virtual address into the physical address of the virtual memory. Where the virtual address is mapped to the non-volatile memory 130, the host 110 may convert the virtual address into the physical address of the non-volatile memory 130 based on the state information of the non-volatile memory 130. In this case, the host 110 may convert the virtual address into the physical address of the non-volatile memory 130 based on a function of the virtual memory.

The host 110 may include a Translation Lookaside Buffer (TLB) (not shown) caching a recently accessed entry from among the entry of the page table and address translation table. The TLB may be embodied as a Content Addressable Memory (CAM).

The TLB may store the virtual address, physical address, and flag. The flag may indicate whether the stored physical address corresponds to a DRAM, that is, the physical address of the virtual memory, or corresponds to the non-volatile memory 130, that is, the physical address of the non-volatile memory 130. The host 110 may read an entry stored in the TLB, and then access the DRAM or non-volatile memory 130 according to a value of flag of the read entry. The host 110 may store data in the DRAM or non-volatile memory 130, or read data from the DRAM or non-volatile memory 130 using a multiplexer or de-multiplexer controlled based on the flag.

In this case, the host 110 may access the DRAM or non-volatile memory 130 using the converted physical address without an interference of the OS.

A virtual memory system may divide a program or data by a page and store pages required for an execution in a main memory. Pages not stored in the main memory may be stored in a relatively slow storage device such as a HDD, and the like.

A physical address of the page stored in the main memory is stored in the page table. The host 110 compares a called address and an entry of the page table, and determines a page fault. The page fault occurs where the page required for the execution is not stored in the main memory. Where the page fault occurs, the host 110 stores the page required for the execution in the main memory, and executes the corresponding page.

The host 110 may be functioned as a virtual memory including a page fault handler.

The state information of physical blocks may include a number of times that each of the physical blocks is erased. The host 110 may control a garbage collection operation with respect to a specific physical block based on the number of times that each of the physical blocks is erased.

The interface 120 transmits the physical address to the non-volatile memory 130 from the host 110, and transmits data between the host 110 and non-volatile memory 130.

The non-volatile memory 130 may store the data for each page and erase the data for each physical block. An operation of storing the data in the non-volatile memory 130 is referred to as a programming operation. Time to store the data in the non-volatile memory 130, takes longer than to read the data from the non-volatile memory 130.

Time to erase the data stored in the physical block of the non-volatile memory 130, takes longer than to program the data in a page of the non-volatile memory 130. Where update of the data stored in the non-volatile memory 130 is required, the non-volatile memory 130 stores updated data in a page of an empty physical block and stores information about a physical block storing previous version data. A physical address of the page storing the updated data is different from a physical address of the page storing the previous version data or physical address of physical block. However, a virtual address recognized by the OS with respect to the updated data is identical to a virtual address recognized by the OS with respect to the previous version data.

Accordingly, a translation between the physical address of the physical block of the non-volatile memory 130 and the virtual address recognized by the OS may be required. A management scheme of the non-volatile memory 130 with respect to a flash memory is referred to as a Flash Translation Layer (FTL). The FTL includes the address translation operation.

In the flash memory, the FTL may include the translation and garbage collection operation. Where an operation of storing the updated data in a new physical block is repeated without erasing the data stored in the physical block of the non-volatile memory 130, an empty physical block of the non-volatile memory 130 is lacking. Since the OS recognizes a memory space using the virtual address, empty memory space recognized by the OS is not identical to the empty physical block of the non-volatile memory 130. Where a proportion of the empty physical block is less than a threshold value, the physical block storing the previous version data and physical block storing the updated version data are merged, the physical block storing the previous version data is erased, and an empty physical block is obtained, which is referred to as the garbage collection operation.

A FTL of a flash memory may be operated in a controller of the flash memory. According to an aspect, the host 110 of the computing system 100 performs a FTL function performed in a flash memory controller, and thus the computing system 100 may efficiently manage the non-volatile memory 130.

The host 110 may perform a wear-leveling function which controls the number of times that each of the physical blocks of the non-volatile memory 130 is erased using similar levels.

The host 110 may manage the address translation table storing correspondence information between the virtual address and physical address, so as to optimize the non-volatile memory 130.

The state information and information about a configuration of the non-volatile memory 130 may be embodied as a driver which may be recognized by the OS. In this case, the host 110 may acquire the state information of the non-volatile memory 130 using a driver corresponding to the non-volatile memory 130.

The host 110 may control an erase operation of a block corresponding to a converted physical address based on state information of the block corresponding to the converted physical address from among blocks of the non-volatile memory 130.

A block where an error of stored data of the blocks of the non-volatile memory 130 exceeds a permissible range may be referred to as a bad block. According to an aspect, the host 110 may identify and manage a bad block of the non-volatile memory 130 based on the state information of the blocks of the non-volatile memory 130.

Where the non-volatile memory 130 has a large capacity, a multi-channel or multi-way input/output (I/O) interface may be provided. According to an aspect, the host 110 may control a multi-channel I/O operation of the non-volatile memory 130 or a multi-way I/O operation of the non-volatile memory 130.

A standard may be prescribed by an agreement of manufacturers of the non-volatile memory 130. In this case, the standard prescribed regarding the non-volatile memory 130 may include information about a size and arrangement of blocks. The host 110 may acquire the state information of the non-volatile memory 130 based on the standard.

The standard may include a number of channels or a number of banks of each of the channels. The channel indicates a unit of block which may input or output data in parallel. The bank indicates a unit of blocks which may be interleaved.

The standard may include a specification of the non-volatile memory 130. The specification of the non-volatile memory 130 may include a unit of data input/output, whether the erase operation exists, a unit of the erase operation where the erase operation exists, and the like.

Depending on embodiments, the standard prescribed regarding the non-volatile memory 130 may be used separately or together with a non-volatile memory host controller interface (NVMHCI). According to another aspect, the standard prescribed regarding the non-volatile memory 130 may be used separately or together with an Open NAND Flash Interface (ONFI).

Figure 2:
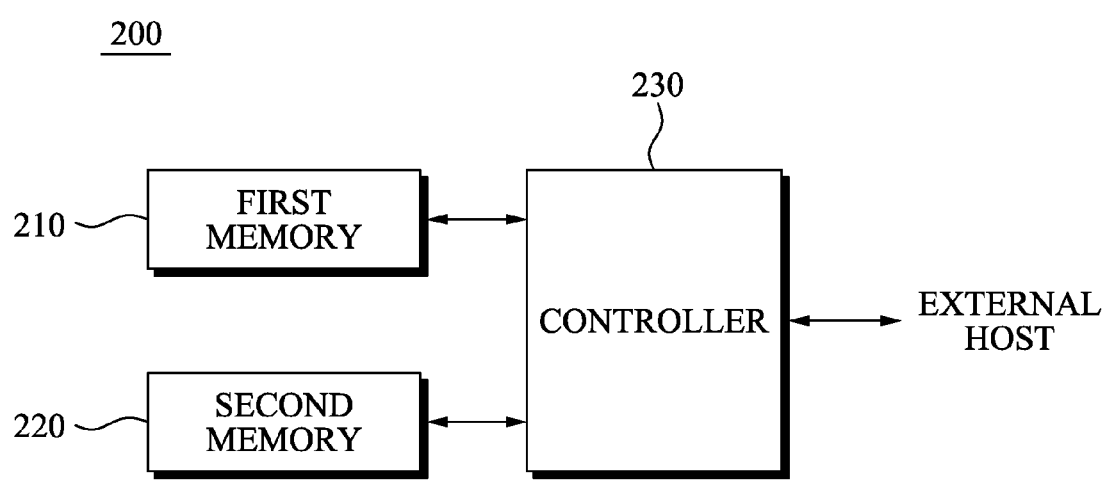
FIG. 2 is a diagram illustrating a memory device according to an exemplary embodiment.

Depending on embodiments, the interface 120 may connect the non-volatile memory 130, host 110, and main memory (not shown in FIG. 1). The main memory may be operated at a relatively high speed. In this case, the interface 120 may be embodied using a north bridge chipset operated at high speed. Depending on embodiments, the interface 120 may include the functions of a north bridge chipset and a south bridge chipset. The south bridge chipset controls access to an optical disk and HDD (not shown). FIG. 2 illustrates an exemplary memory device 200.

As illustrated in FIG. 2, the memory device 200 includes a first memory 210, a second memory 220, and a controller 230.

The first memory 210 has a first storage capacity. The second memory 220 has a second storage capacity which may be greater than the first storage capacity.

The controller 230 provides an external host with an address space corresponding to a third storage capacity. The third storage capacity may be greater than the first storage capacity and less than a sum of the first storage capacity and second storage capacity.

Where data requested from the external host is stored in the first memory 210, the controller 230 reads the requested data from the first memory 210. The controller 230 transmits the data read from the first memory 210 to the external host.

Where the data requested from the external host is not stored in the first memory 210, the controller 230 reads the requested data from the second memory 220. The controller 230 transmits the data read from the second memory 220 to the external host.

Depending on embodiments, the first memory 210 may be a volatile memory, and the second memory 220 may be a non-volatile memory. That is, the second memory 220 may be a non-volatile memory with a large storage capacity and the first memory 210 may be a high speed volatile memory. Thus, the memory device 200 having a large storage capacity may be operated at a relatively high speed with respect to the external host.

Depending on embodiments, the second memory 220 may be a non-volatile memory which retains stored data for a predetermined time even when not powered. For example, where the second memory 220 retains data for three days when not powered, a user of the memory device 200 may generally repair a computing system or restore the data within three days. Accordingly, the memory device 200 may provide the user with backup data when an unexpected accident occurs.

Depending on embodiments, the second memory 220 may be a non-volatile memory which is randomly accessible by a word and/or byte. For example, a non-volatile random access memory (RAM) may be a Ferroelectric Random Access Memory (FRAM), a Phase-change Random Access Memory (PRAM), a Magnetic Random Access Memory (MRAM), a battery-backed RAM, and the like. Also, a non-volatile memory, which may be the second memory 220, may be a NAND flash memory, NOR flash memory, AND flash memory, and the like. The second memory 220 may be a magnetic disk such as a HDD.

Where the second memory 220 is a non-volatile memory, data accessible by the external host and data associated with a file system of the second memory 220 may be stored in the first memory 210. The controller 230 performs a translation between a physical address and a virtual address, and thus the external host may manage a memory in the OS using a virtual address recognized by the OS. Accordingly, the memory device 200 may reduce interface complexity between the memory device 200 and the external host.

An address may be divided into a plurality of address fields. The address indicates an address space provided to the external host. According to an aspect, an address of the address space of the first memory 210 and second memory 220 may be divided into a plurality of address fields, and the address of the address space may be provided to the external host. For example, where the address indicating the address space provided to the external host is represented as 20 bits, the address may be divided into an address field A of 12 bits and address field B of 8 bits.

The controller 230 may access the first memory 210 using the address field A and address field B.

Depending on embodiments, the address indicating the address space provided to the external host may be divided into the address fields A, B, C, and D. In this case, the controller 230 may access the first memory 210 using a first address and a second address. The first address is generated by combining the address field A and address field B. The second address is generated by combining the address field C and address field D.

Depending on embodiments, the controller 230 may set the address field A as a first address, set the address field B as a second address, and set an address generated by combining the address field C and address field D as a third address. According to an aspect, a first address generated by combining the address field A and address field C and a second address generated by combining the address field B and address field D may be used.

Depending on embodiments, the first address may be a row address, and the second address may be a column address. The external host may transmit the row address to the memory device 200 for a first time interval, and transmit the column address for a second time interval.

The first memory 210 may be configured to be accessed by referring to the row address and column address. The first memory 210 may access a DRAM or Static RAM (SRAM) by referring to the row address and column address. In this case, the controller 230 may access the first memory 210 by referring to the row address and column address. The controller 230 may determine whether data requested from the external host is stored in the first memory 210 using the row address.

Where the data requested from the external host is not stored in the first memory 210, the controller 230 may read the requested data from the second memory 220 while receiving the row address from the external host. The controller 230 accesses the second memory 220 using a time to wait for the row address from the external host, and thereby may quickly transmit the requested data to the external host.

Where the data requested from the external host is not stored in the first memory 210, the controller 230 may read a data block corresponding to a row address of the requested data from the second memory 220, and store the data block in the first memory 210. Data swapping between the first memory 210 and the second memory 220 may be performed for each data block corresponding to a row address. According to an aspect, the data block corresponding to the row address may be referred to as a page.

Where the data swapping between the first memory 210 and the second memory 220 is generated, the controller 230 may newly store the row address of the stored page or data block in the first memory 210. The controller 230 may newly store the row address of the stored page or data block in the first memory 210, or store the row address in a separate buffer memory (now shown).

A page table is a memory storing an activated physical address. A physical address corresponding to a virtual address received from the external host is not stored in the page table, which is a page fault. The page fault indicates that data required by the external host is not stored in the memory device 200. The physical address corresponding to the virtual address received from the external host is stored in the page table, which indicates that data required by the external host is stored in the memory device 200. According to an aspect, the page table may be located outside of the memory device 200. In this case, the page table may determine whether a page fault of the virtual address received from the external host is generated. Also, the page table may transmit a physical address corresponding to the received virtual address to the memory device 200. The physical address is a physical address of a virtual memory system. According to an aspect, the page table may be located in the memory device 200. Where the controller 230 includes the page table, the controller 230 may determine whether the page fault of the virtual address received from the external host is generated. Also, the page table may transmit data read from the first memory 210 or second memory 220 to the external host, where the page fault is not generated.

Figure 3:
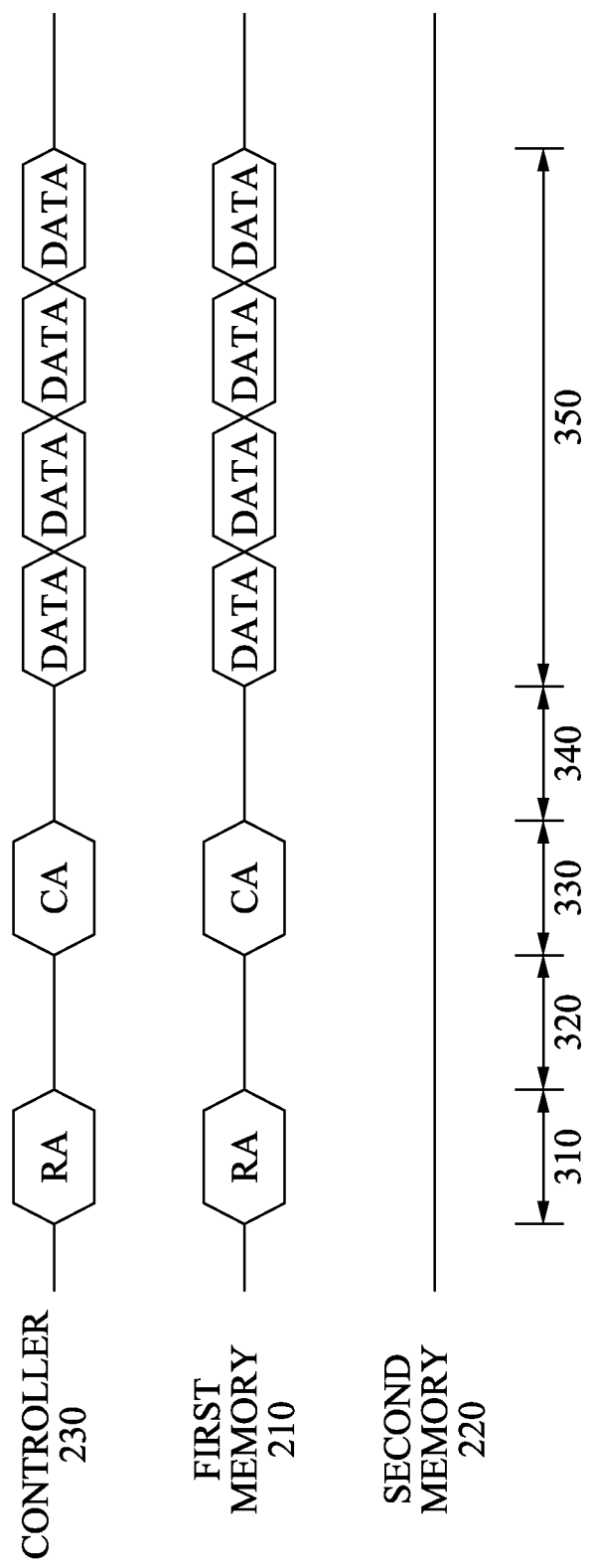
FIG. 3 is a timing diagram illustrating an operation of a memory device according to an exemplary embodiment.

FIG. 3 illustrates a timing diagram illustrating an exemplary operation of a memory device 200 of FIG. 2.

Referring to FIG. 3, an operation of the memory device 200 where data requested from the external host is stored in the first memory 210 is illustrated.

The controller 230 receives a row address (RA) of the data requested from the external host during a time interval 310. The controller 230 searches data blocks or pages corresponding to the RA of the data, requested from the external host, from among data blocks or pages stored in a first memory 210 during the time interval 310.

As a result of the searching, where the data blocks or pages corresponding to the RA of the data, requested from the external host, are stored in the first memory 210, the first memory 210 prepares to output the requested data.

Where the first memory 210 is an SRAM or DRAM, the first memory 210 may activate a word line corresponding to the received RA during a time interval 320.

The controller 230 and external host may stand by during the time interval 320 based on a length of the time interval 320. Where the time interval 320 is short enough, the first memory 210 may activate the word line during the time interval 310. In this case, the controller 230 and external host may disregard the time interval 320 and perform a subsequent operation.

The controller 230 receives a column address (CA) of the requested data during a time interval 330. The first memory 210 may activate a column storing the requested data using the received CA during the time interval 330.

A time interval 340 indicates latency until the data is outputted from the first memory 210.

The first memory 210 outputs the requested data during a time interval 350, and the controller 230 transmits the data outputted by the first memory 210 to the external host.

Figure 4:
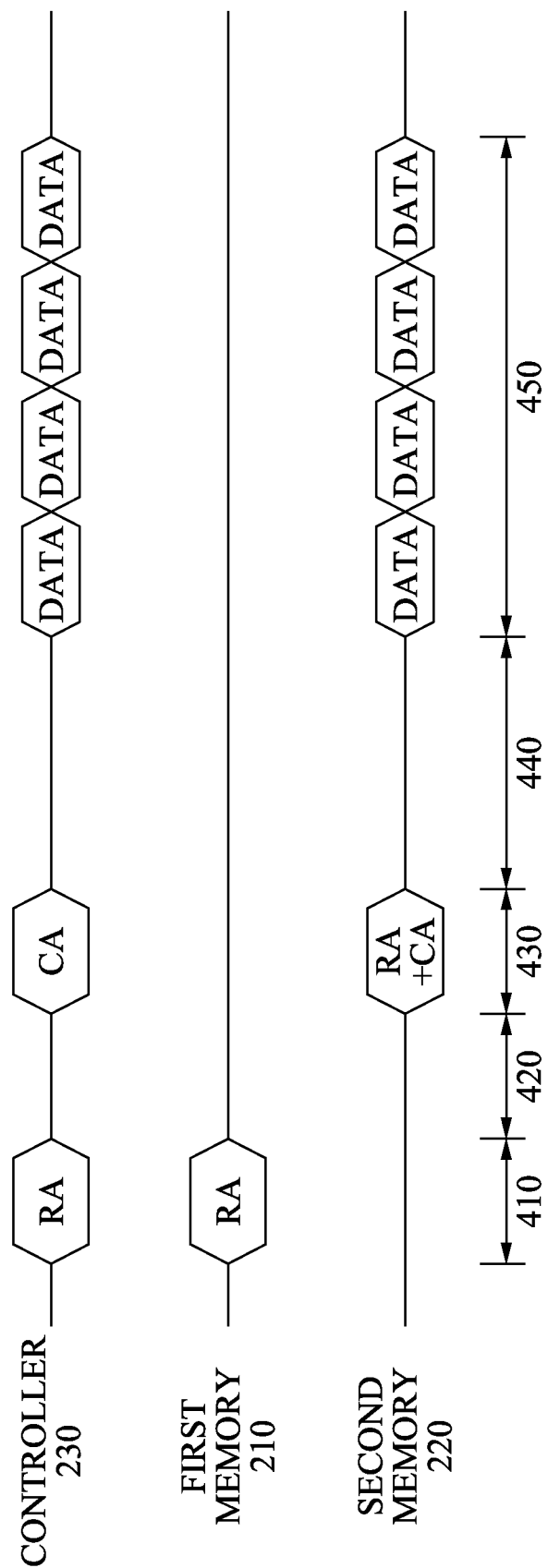
FIG. 4 is a timing diagram illustrating an operation of a memory device according to another exemplary embodiment.

FIG. 4 illustrates a timing diagram illustrating another exemplary operation of a memory device 200 of FIG. 2.

Referring to FIG. 4, an operation of the memory device 200 where the data requested from the external host is not stored in the first memory 210 is illustrated.

The controller 230 receives an RA of the data requested from the external host during a time interval 410. The controller 230 searches data blocks or pages corresponding to the RA of the data, requested from the external host, from among data blocks or pages stored in a first memory 210 during the time interval 410.

As a result of the searching, where the data blocks or pages corresponding to the RA of the data, requested from the external host, are not stored in the first memory 210, the controller 230 may transmit the RA to the second memory 220.

A time interval 420 indicates latency the same as the time interval 320. The controller 230 and external host may stand by during the time interval 420.

Although it is illustrated that the controller 230 stands by during the time interval 420 in FIG. 4, the controller 230 may access the second memory 220 using the RA according to another exemplary embodiment. The second memory 220 may activate a data block or page corresponding to the RA during the time interval 420. The second memory 220 may activate a word line corresponding to the RA during the time interval 420, and thereby may activate the data block or page.

The controller 430 receives a CA of the requested data during a time interval 430.

In an embodiment where the controller 230 and second memory 220 stand by during the time interval 420, the second memory 220 may prepare to output the requested data based on the received RA and CA during the time interval 430.

In an embodiment where the second memory 220 activates the data block or page corresponding to the RA during the time interval 420, the second memory 220 may prepare to output data corresponding to the CA from among the activated data block or page during the time interval 430.

Where the data block or page corresponding to the RA is activated, the controller 230 may store the activated data block or page in the first memory 210. In this case, where empty space does not exist in the first memory 210, the controller 230 may evict a portion of the data blocks or pages stored in the first memory 210 to the second memory 220. The controller 230 may store an RA of each of the data blocks or pages stored in the first memory 210 in a separate buffer memory, and store the RA of each of the data blocks or pages stored in the first memory 210 using a portion of storage space of the first memory 210.

A time interval 440 indicates latency until the data is outputted from the second memory 220.

The second memory 220 outputs the data requested from the external host during a time interval 450, and the controller 230 transmits the data outputted by the second memory 220 to the external host.

Where the first memory 210 is faster than the second memory 220, a length of the time interval 440 may be longer than the time interval 340.

Where the requested data is not stored in the first memory 210, the memory device 200 may access the second memory 220 for a time to receive the RA from the external host and process the received RA, and thereby may reduce latency spent for transmitting the data to the external host.

The memory device 200 may be directly connected to the external host or processor using a memory bus, or connected to the external host via a memory bridge.

The memory device 200 may transmit or receive data through a dedicated path which does not pass the external host and another 1/0 device connected to the memory bridge.

The external host may access the memory device 200 using a virtual address, not using a physical address or logical address based on a physical characteristic of the memory device 200. The memory device 200 may be recognized by the external host as a storage device which has a virtual address space and has a relatively fast operation speed. The virtual address space corresponds to a third storage capacity, and the operation speed is similar to an operation speed of the first memory 210.

Where the memory device 200 stores new data using the external host, the memory device 200 may use a write-through scheme or write-back scheme, Where the memory device 200 uses the write-through scheme, the controller 230 may store data in the first memory 210 as well as a location corresponding to the second memory 220.

Where the memory device 200 uses the write-back scheme, the controller 230 may store a flag as well as data in the first memory 210. The flag indicates that data is newly stored in the first memory 210. The controller 230 may transmit an acknowledgement (ACK) after storing the data in the first memory 210. The ACK informs to the external host that the data is stored. Where a predetermined time passes, the controller 230 may store the data newly stored in the first memory 210 in the location corresponding to the second memory 220, and reset the flag stored in the first memory 210.

Depending on embodiments, an address translation table may be stored in the first memory 210 or second memory 220. The controller 230 may include a TLB. The TLB may be configured as a CAM, and store an entry about a recently accessed virtual address from among entries stored in the address translation table. The controller 230 may quickly convert the virtual address into a physical address of the first memory 210 or second memory 220 using the TLB.

An interface between the controller 230 and first memory 210 may be a memory bus and be configured using a network on chip (NoC) scheme. An interface between the controller 230 and second memory 220 may be the memory bus, and be configured using the NoC scheme.

The controller 230 may store a page including the data requested from the external host in the first memory 210 from the second memory 220. Where the empty space does not exist in the first memory 210, the controller 230 may select a page to be evicted from among pages stored in the first memory 210. The controller 230 may select and evict a page with low temporal locality.

Management of the address translation table of the memory device 200 and page swapping may be processed by a dedicated hardware logic or software operated by a general purpose processor. Depending on embodiments, the management and page swapping may be processed by using both hardware and software together.

Where the management and page swapping are processed by software, an SRAM and cache memory may be used to store data and code of the processor at high speed.

Depending on embodiments, the first memory 210 may be a non-volatile RAM. The non-volatile RAM may be a PRAM, FRAM, MRAM, and the like. The non-volatile RAM may be a non-volatile memory randomly accessible by a word or byte. In this case, the memory device 200 may be recognized by the external host as a non-volatile memory which is fast and has a large capacity.

Depending on embodiments, where the memory device 200 is not powered, the controller 230 may generate an interrupt signal using a battery or super capacitor. Where the interrupt signal is generated, the controller 230 may store data, not stored in the second memory 220, from among data stored in the first memory 210 in the second memory 220. In this case, the memory device 200 may be recognized by the external host as the non-volatile memory.

The battery may be located in or outside of the memory device 200. A circuit sensing whether power is cut off may be included in the controller 230, or located outside of the memory device 200. Where the circuit sensing the power cutoff is located outside of the memory device 200, a sensed event may be reported to the memory device 200.

Depending on embodiments, the memory device 200 may include a plurality of non-volatile memories as well as the second memory 220. In this case, the controller 230 may control the plurality of non-volatile memories to perform a multi-channel I/O operation. The controller 230 may control the plurality of non-volatile memories to be interleaved and perform a multi-way I/O operation. The controller 230 may maintain an address translation layer to support the multi-channel I/O operation or multi-way I/O operation.

Figure 5:
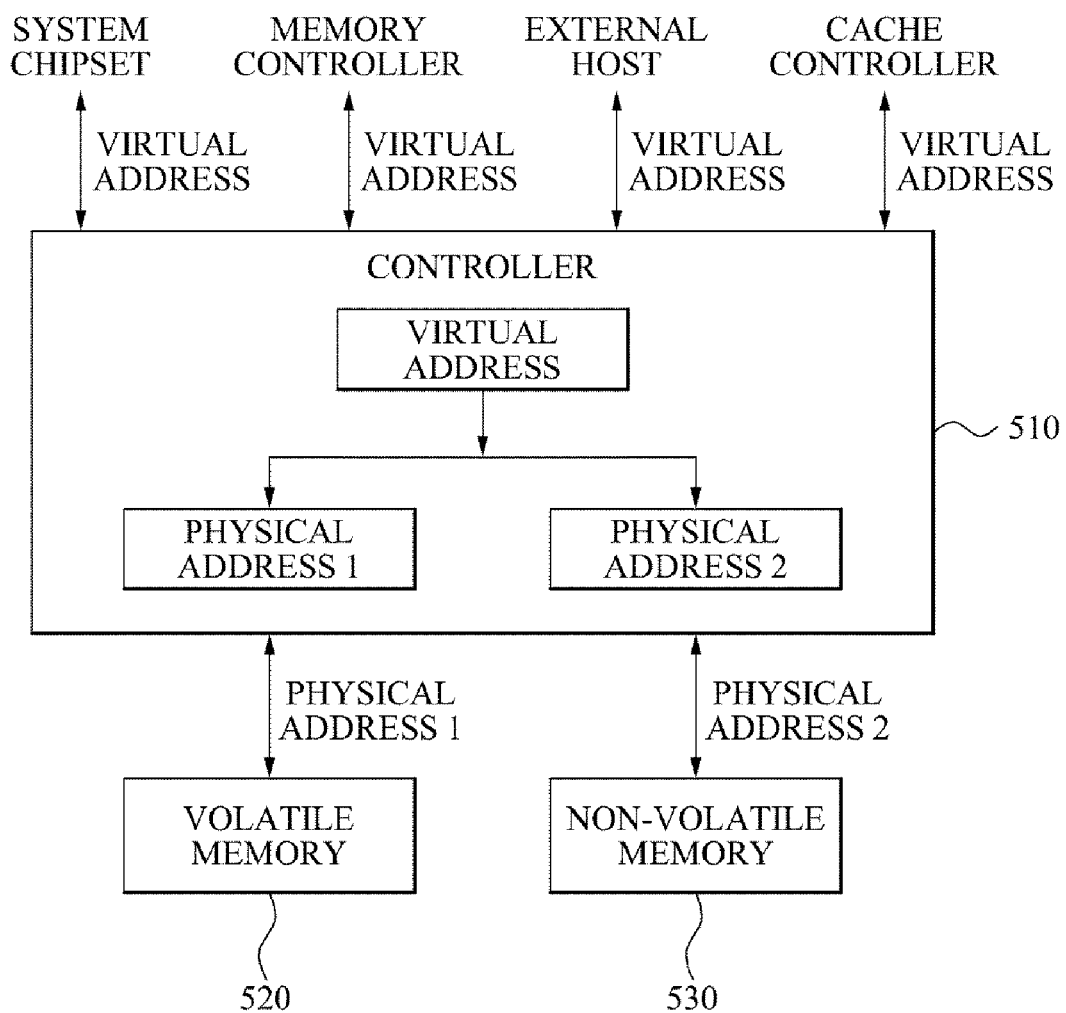
FIG. 5 is a diagram illustrating a memory device according to another exemplary embodiment.

FIG. 5 illustrates another exemplary memory device 500.

As illustrated in FIG. 5, the memory device 500 includes a controller 510, a volatile memory 520, and a non-volatile memory 530.

The controller 510 receives a virtual address from an external host. The controller 510 may convert the virtual address into a physical address of the volatile memory 520, that is, a physical address 1, or convert the virtual address into a physical address of the non-volatile memory 530, that is, a physical address 2, based on temporal locality of the received virtual address.

The controller 510 may convert the virtual address into the physical address 1, where temporal locality may be quickly referred to again due to high temporal locality of the virtual address. The controller 510 may store a translation relation between the virtual address and physical address 1, and a translation relation between the virtual address and physical address 2.

The external host may access the memory device 500 using the virtual address recognized in an OS without considering a physical characteristic of the memory device 500. Accordingly, the memory device 500 may perform a virtual memory or file system function of an external host. The external host leaves a memory management function to the memory device 500, and thereby may improve the memory management efficiency.

Since operations of reading, writing, and erasing data may be unevenly performed in the non-volatile memory 530, the controller 510 converts the virtual address into the physical address 2 based on physical characteristic information of the non-volatile memory 530.

Figure 7:
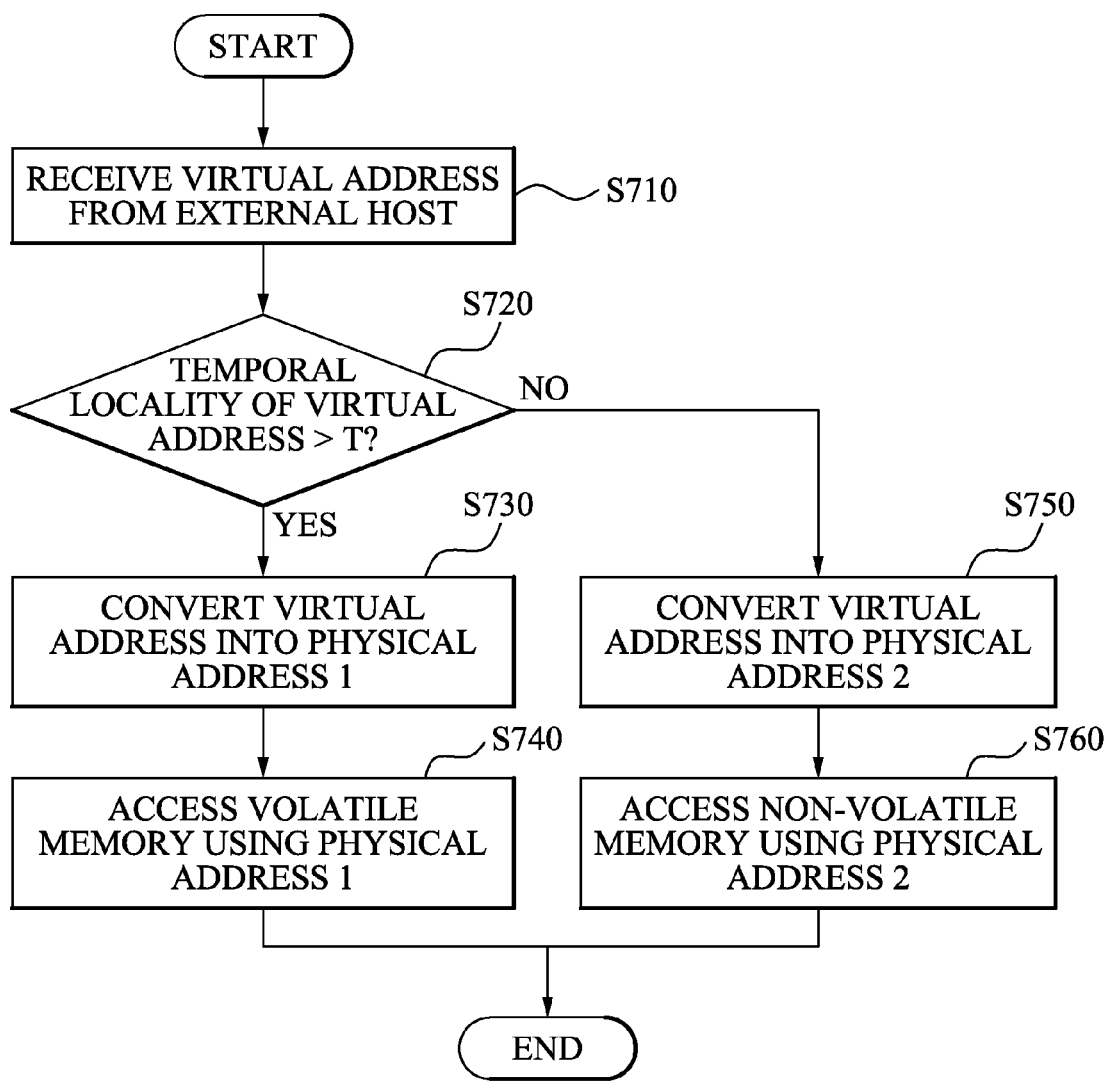
FIG. 7 is a diagram illustrating an operation of a memory device according to an exemplary embodiment.

FIG. 7 illustrates an exemplary operation of the controller 510 of FIG. 5.

Referring to FIG. 7, in operation S710, the controller 510 receives a virtual address from an external host. In operation S720, the controller 510 compares temporal locality of the received virtual address with a predetermined standard, T. In operation S730, the controller 510 converts the virtual address into a physical address 1, where the temporal locality of the virtual address is greater than T. In operation S740, the controller 510 accesses a volatile memory 520 using the converted physical address 1. In operation S750, the controller 510 converts the virtual address into a physical address 2, where the temporal locality of the virtual address is not greater than T. In operation S760, the controller 510 accesses a non-volatile memory 530 using the converted physical address 2.

Figure 6:
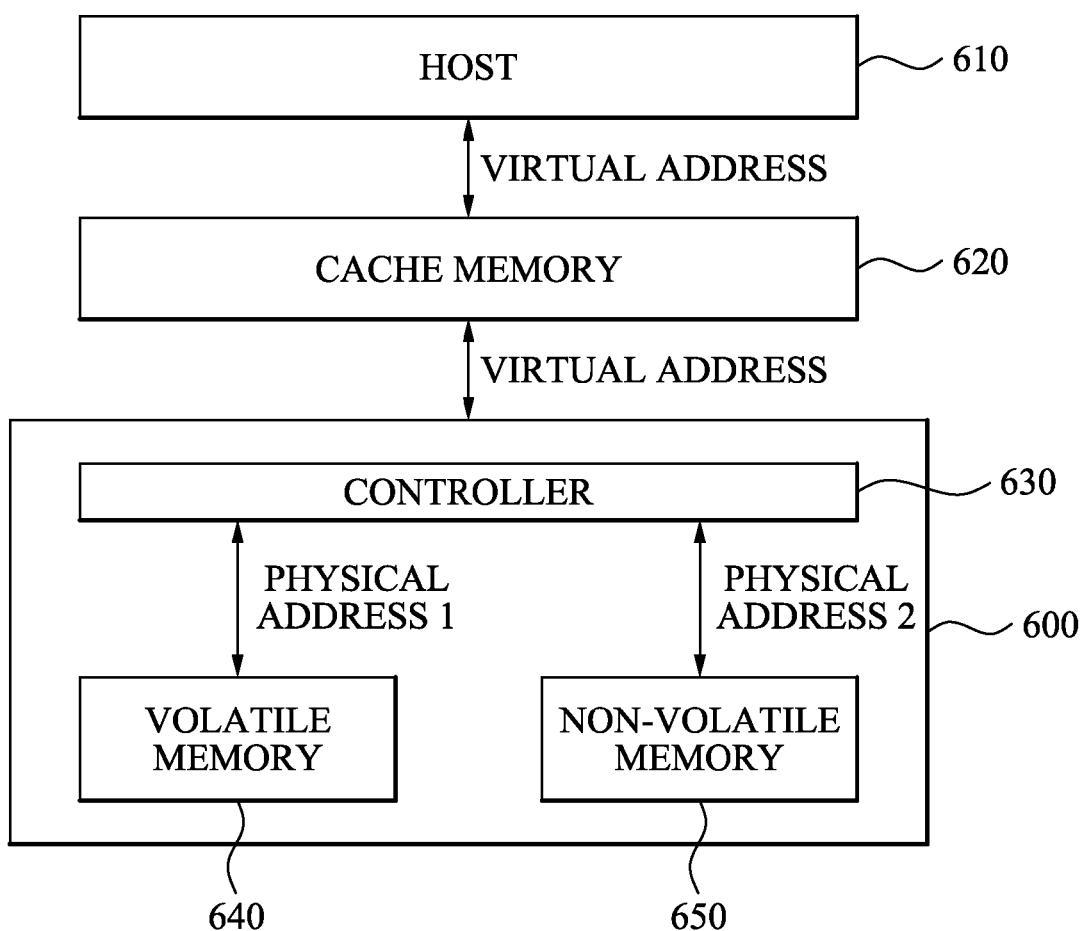
FIG. 6 is a diagram illustrating a memory device according to still another exemplary embodiment.

FIG. 6 illustrates a memory device 600 according to still another exemplary embodiment.

Referring to FIG. 6, the memory device 600 includes a controller 630, a volatile memory 640, and a non-volatile memory 650.

The controller 630 receives a virtual address from a controller of an external cache memory 620 or external host 610. The controller 630 determines that the received virtual address corresponds to a first area or second area, for example, based on predetermined allocation information according to a data characteristic corresponding to the virtual address. Depending on embodiments, the controller 630 may receive the virtual address from a memory controller or system chipset.

As a result of the determining, where the received virtual address corresponds to the first area, the controller 630 converts the virtual address into a physical address of the volatile memory 640. Also, where the received virtual address corresponds to the second area, the controller 630 converts the virtual address into a physical address of the non-volatile memory 650.

The host 610 may determine a virtual address corresponding to data based on temporal locality of the data. Where the data have high temporal locality, the host 610 may determine the virtual address corresponding to the data as a virtual address corresponding to the first area. Where the data have low temporal locality, the host 610 may determine the virtual address corresponding to the data as a virtual address corresponding to the second area.

The host 610 may access the cache memory 620 using the determined virtual address. Where a cache miss occurs in the cache memory 620, the cache memory 620 may access the memory device 600 using the determined virtual address.

The volatile memory 640 and non-volatile memory 650 of the memory device 600 are located on a same hierarchical layer.

Depending on embodiments, the controller 630 may select the volatile memory 640 or non-volatile memory 650 simply based on the virtual address. In this case, an operation of converting the virtual address into the physical address 1 or physical address 2 may be performed by referring to an address translation table.

According to an aspect, a memory device may process a read and write command by a word or byte, and sequentially process I/O based on a burst mode signal. According to another aspect, where an external host prescribes a range of I/O operations, a memory device may process I/O corresponding to the prescribed range. The range of I/O operation may be represented as a start address and end address or start address and amount of I/O.

The memory device may use a Double Data Rate (DDR) or Peripheral Component Interconnect Express (PCIE) scheme to process a burst mode I/O.

The memory device may provide the external host with a combined address space or a plurality of divided address spaces. An address may be transmitted and/or received between the memory device and external host to be provided with the combined address space. An index and address of the address space may be transmitted and/or received between the memory device and external host to be provided with the plurality of divided address spaces. The index and address of the address space may be transmitted through physical paths different from each other, or be sequentially transmitted through physical paths identical to each other.

The memory device may provide the external host with non-uniform access time, and may use a signal indicating that data is being prepared now, or use a predetermined signal indicating a time until the data is prepared.

The external host may perform different tasks in advance for a waiting time, based on data preparation time information of the memory device. The memory device may transmit a signal indicating a preparation state where data requested from the external host is prepared.

The external host may set an access authority to an address space of the memory device such as an authority to read, write, perform, change, and share. The address space corresponds to the virtual address. The external host may transmit an identification (ID) of a currently implemented process or a priority level to the memory device.

An ID with a top prior authority and limit of ID authority may be embodied by hardware.

According to another embodiment, the ID with the top prior authority or priority level may be defined in advance, and set an access authority to a specific memory address using the defined ID or priority level. The external host, processor, or OS may control access to the ID with the top prior authority or priority level.

The external host may include a TLB. The external host may access an L1 or L2 cache using a virtual address or physical address.

Depending on embodiments, the external host may not include the TLB, and access the L1 or L2 cache using the virtual address. Where a cache miss with respect to the L1 or L2 cache occurs, the external host may access the memory device. In this case, the virtual address corresponds to an address space of the memory device. Where the memory device provides a plurality of address spaces, a cache may recognize an address space ID and may not be flushed where a context exchange is performed. According to an aspect, the cache may not recognize the address space ID and may be flushed where the context exchange is performed.

Where the OS uses a virtual memory, a multiple address space may be used. In this case, the OS assigns a single address space to a single process. A kernel of the OS is mapped to a particular area of the address space. An application may be mapped to a particular area and have at least one thread. A communication among threads in a same process may use less resource than a communication among threads in processes different from each other.

When using the single address space, the OS may sequentially map each process to an address space. Where the address space is lacking, the OS may terminate at least one process. Also, where the address space is lacking, the OS may stand by until an available memory space is obtained, or return an error message.

A file system of the OS may be configured using a portion of the address space. The file system of the OS may be configured using a file system of the memory device.

Where the memory device includes a plurality of address spaces, each of the processes may have a single address space. In this case, the file system may have the at least one address space. The memory device may manage an address translation table to prevent an internally generated data miss from being externally recognized.

Where the external host directly accesses the address space of the memory device, an additional address translation may not be required. Where the memory device supports a plurality of address spaces, a sufficient number of address spaces exist, and a size of the address space is larger than a capacity required by the external host, the page swapping may not be required.

According to certain embodiments described above, a computing system or memory device has a non-volatile memory-based configuration, and thus time for spin-up of a HDD may not be required. The spin-up is an operation to raise a rotation speed to reach a predetermined level. Also, the computing system or memory device uses a dedicated path when transmitting data between a storage device such as a HDD and the memory device, and thereby may reduce a booting time.

According to certain embodiments described above, a computing system or memory device internally handles a page fault, and thereby may reduce a handling time. When receiving a request for a data write from the external host, the memory device simultaneously transmits the acknowledgement and internally handles an actual data storage operation. Accordingly, a response time to the external host may be reduced.

The memory device controls an operation of DRAM based on a working set of the external host, and thereby may reduce power consumption.

The memory device offloads a memory management function from among control functions concentrated on the external host, and thereby may reduce complexity of the external host. Where the external host is a multi-core processor, the memory device may efficiently manage a multiple address space.

A multi-core processor with a symmetric multi-processor (SMP) configuration shares metadata, which manages a virtual address space, with cores, and thereby increases a cost of synchronization among cores. The memory device offloads a management function of the virtual address space from the multi-core processor, and thus each core of the multi-core processor with the SMP configuration may directly access the virtual address space without synchronization.

Where the memory device is recognized as a non-volatile max memory to the external host, the external host may not require performing an additional function to manage a volatile memory. Accordingly, the complexity of the external host may be reduced.

The memory device combines and manages the memory management function distributed to the external host, flash memory, and the like, and thereby may reduce a repeated use of resources.

Also, the memory device may easily embody a system-in package (SiP) by combining and managing the memory management function.

Flash memory devices and/or memory controllers according to exemplary embodiments may be embodied using various types of packages. For example, types of packages include Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory device and/or the memory controller may constitute a memory card. In this case, the memory controller may be constructed to communicate with an external device, for example, a host, using any one of various types of protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory device may be a non-volatile memory device that may maintain stored data even when power is cut off. With increase in use of mobile devices such as a cellular phone, a personal digital assistant (PDA), a digital camera, a portable game console, and an MP3 player, the flash memory device may be more widely used as a data storage and/or a code storage. The flash memory device may be used in home applications such as a high definition television (HDTV), a digital video disk (DVD), a router, and a Global Positioning System (GPS).

A computing system according to an exemplary embodiment may include a microprocessor that is electrically connected with a bus, a user interface, a modem such as a baseband chipset, a main controller, and a flash memory device. The flash memory device may store N-bit data via the main controller. The N-bit data is processed or will be processed by the microprocessor and N may be 1 or an integer greater than 1. Where the computing system is a mobile apparatus, a battery may be additionally provided to supply operation voltage of the computing system.

It will be apparent to those of ordinary skill in the art that the computing system according to the exemplary embodiment may further include an application chipset, a camera image processor (CIS), a mobile Dynamic Random Access Memory (DRAM), and the like. The main controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory device, comprising:
a first memory configured to have a first storage capacity;
a second memory configured to have a second storage capacity greater than the first storage capacity; and
a controller configured to receive a virtual address from an external host and configured to provide the external host with an address space corresponding to a third storage capacity, the third storage capacity being less than a sum of the first storage capacity and second storage capacity,
wherein the controller converts and translates the virtual address into a physical address of either the first or second memory based on a temporal locality of the received virtual address, where data requested from the external host is stored in the first memory, the controller transmits the requested data from the first memory to the external host, and where the requested data is not stored in the first memory, the controller transmits the requested data from the second memory to the external host.

2. The memory device of claim 1, wherein an address indicating the address space provided to the external host is divided into a plurality of address fields, and the controller accesses the first memory by referring to a first address and second address of the divided address fields, and determines whether the requested data is stored in the first memory using the first address.

3. The memory device of claim 2, wherein the controller, where the requested data is not stored in the first memory, reads the requested data from the second memory while receiving the second address from the external host.

4. The memory device of claim 2, wherein the controller, where the requested data is not stored in the first memory, reads a data block corresponding to a second address of the requested data from the second memory, and stores the data block in the first memory.

5. The memory device of claim 2, wherein the first address is a row address and the second address is a column address.

6. The memory device of claim 1, wherein the third storage capacity is greater than the first storage capacity.

7. The memory device of claim 6, wherein the second memory is a non-volatile memory which retains stored data when not powered and is randomly accessible to the external host by a word.

8. A computing system, comprising:
a non-volatile memory;
a host configured to convert a virtual address into a physical address of the non-volatile memory based on state information of blocks of the non-volatile memory; and
an interface configured to transmit the physical address of the non-volatile memory from the host to the non-volatile memory, and transmit data between the host and the non-volatile memory, wherein a controller performs a translation between the physical address and the virtual address and the host manages a memory in an operating system using a virtual address recognized by the operating system.

9. The computing system of claim 8, wherein the state information comprises a number of times that each of the blocks is erased.

10. The computing system of claim 8, wherein the host converts the virtual address into any one of a physical address of a virtual memory and the physical address of the non-volatile memory, stores a correspondence between the virtual address and the physical address of the virtual memory or a correspondence between the virtual address and the physical address of the non-volatile memory, and stores a flag indicating a characteristic of the stored physical address.

11. The computing system of claim 8, wherein the host controls a garbage collection operation with respect to each of the blocks of the non-volatile memory using the physical address of the non-volatile memory.

12. The computing system of claim 8, wherein the host acquires the state information of the non-volatile memory using a driver, and controls an erase operation of a block corresponding to the physical address of the non-volatile memory based on the state information of the block corresponding to the physical address of the non-volatile memory from among blocks of the non-volatile memory, the driver corresponding to the non-volatile memory and being provided by an operating system.

13. The computing system of claim 8, wherein the non-volatile memory includes a standard configuration prescribed based on a standard, and the host acquires the state information based on the standard configuration, the standard configuration prescribing at least one of a number of channels of the non-volatile memory, a number of banks for each channel of the non-volatile memory, and a unit of an erase operation of the non-volatile memory.

14. A memory device, comprising:
a volatile memory;

a non-volatile memory; and a controller configured to receive a virtual address from an external input, and configured to convert the virtual address into any one of a physical address of the volatile memory and a physical address of the non-volatile memory based on temporal locality of the virtual address wherein the controller performs a translation between the physical address and the virtual address and a host manages a memory in an operating system using a virtual address recognized by the operating system.

15. The memory device of claim 14, where the controller stores a correspondence between the virtual address and the converted physical address of any one of the volatile memory and the non-volatile memory.

16. The memory device of claim 14, wherein the external input is any one of an external host, an external cache controller, a memory controller, and a system chipset.

17. A memory device, comprising:

a volatile memory;

a non-volatile memory; and a controller configured to receive a virtual address from any one of an external host, an external cache controller, a memory controller, and a system chipset, and determines whether the virtual address corresponds to a first area or a second area, wherein the controller, where the virtual address corresponds to the first area, converts the virtual address into a physical address of the volatile memory, and where the virtual address corresponds to the second area, converts the virtual address into a physical address of the non-volatile memory wherein the controller performs a translation between the physical address and the virtual address.

18. The memory device of claim 17, wherein the controller determines whether the virtual address corresponds to the first area or the second area based on allocation information determined by any one of the external host, external cache controller, memory controller, and system chipset according to a data characteristic corresponding to the virtual address.

19. The memory device of claim 17, wherein whether the virtual address corresponds to the first area or the second area is determined by the external host or the external cache controller based on temporal locality of data corresponding to the virtual address.

20. The memory device of claim 17, wherein the external host is configured to access the memory device using the virtual address without considering a physical characteristic of the memory device and the external host is a multi-core processor.

* * * * *